United States Patent Office 3,812,083
Patented May 21, 1974

3,812,083
THERMOSETTING PERHALOGENATED POLYMERS
Robert J. Jones, Hermosa Beach, and Eugene A. Burns, Palos Verdes Peninsula, Calif., assignors to TRW Inc., Redondo Beach, Calif.
No Drawing. Filed Apr. 3, 1972, Ser. No. 240,771
Int. Cl. C08f 15/04, 15/06
U.S. Cl. 260—63 UY                        10 Claims

ABSTRACT OF THE DISCLOSURE

Resins having excellent thermal and chemical stability can be made by curing chemically stable alicyclic endo end capped prepolymers. The prepolymers can be made by end capping an aromatic or aliphatic perhalogenated polymer with an alicyclic endo compound having the formula:

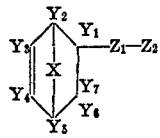

wherein $Y_1$–$Y_7$, inclusive, can be hydrogen, halogen, nitro, aryl, alkyl, alkyl ether, or alkyaryl; X can be carbonyl, oxygen, sulfur, methylene, halogen substituted methylene, alkyl substituted methylene, or aryl substituted methylene; $Z_1$ can be an arylene or an alkylene or halogen substituted alkylene group having 0 to 4 carbon atoms; and $Z_2$ is a vinyl or substituted vinyl. The end capping compounds are synthesized by reacting a cyclo diolefin with an olefinic compound according to a Diels-Alder reaction.

BACKGROUND OF THE INVENTION

The present invention relates to stable, high performance aliphatic or aromatic perhalogenated resins. Resins, according to this invention, are produced by a pyrolytic polymerization of prepolymers having reactive terminal groups. Pyrolytic polymerization is the coreaction of the reactive groups located at the terminal ends of the prepolymer upon heating at elevated temperature to cause chain extension and crosslinking of the prepolymer segment.

Polyimide resins have been produced by the pyrolytic polymerization reaction of polyimide prepolymer having end caps of bicyclo (2.2.1) hept-5-end-2,3-anhydride as disclosed in U.S. Pat. 3,528,950. The polyimide prepolymer was produced by reacting a diamine with a dianhydride and end capping the chain with a monoanhydride having the structure:

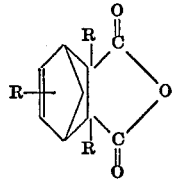

where R is hydrogen or an alkyl group.

Synthesis of compounds similar to the alicyclic endo compounds used herein have been disclosed by Diels and Alder in U.S. Pat. 1,944,731. These compounds are produced by reacting a diene with a dienophile to produce a six membered ring compound.

SUMMARY OF THE INVENTION

The high performance aliphatic or aromatic resins of this invention are produced by end capping a perhalogenated polymer chain with a substituted alicyclic endo compound. The perhalogenated substituted compound can be aliphatic or aromatic. The polymer chain is produced by end capping a perhalogenated polymer with a substituted alicyclic endo compound having the formula:

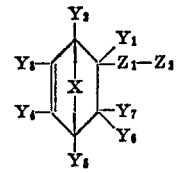

where $Y_1$–$Y_7$, inclusive, may be selected from hydrogen, halogen, nitro, aryl, alkyl having 1 to 6 carbon atoms, alkyl ether having 1 to 6 carbon atoms, or alkaryl; X may be selected from any carbonyl, oxygen, sulfur, methylene, halogen substituted methylene, alkyl substituted methylene, or aryl substituted methylene; $Z_1$ is an arylene or an alkylene or halogen substituted alkylene radical having 0 to 4 carbon atoms; $Z_2$ may be selected from:

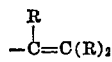

where R is hydrogen, halogen, or a monovalent aliphatic or aromatic radical.

The end capping endo compound is produced by a Diels-Alder reaction wherein a cyclo diolefin having a formula:

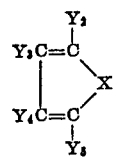

wherein $Y_2$–$Y_5$, inclusive may be selected from any of hydrogen, halogen, nitro, aryl, alkyl having 1 to 6 carbon atoms, alkyl ether having 1 to 6 carbon atoms, alkaryl; and X may be selected from any of carbonyl, oxygen, sulfur, methylene, halogen substituted methylene, alkyl substituted methylene and aryl substituted methylene is reacted with an olefinic compound having the formula:

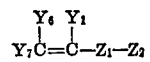

wherein $Y_1$, $Y_6$, and $Y_7$ may be selected from any of hydrogen, halogen, nitro, aryl, alkyl having 1 to 6 carbon atoms, alkyl ether having 1 to 6 carbon atoms, alkaryl; $Z_1$ is an arylene or in alkylene or halogen substituted alkylene radical having 0 to 4 carbon atoms; and $Z_2$ may be selected from:

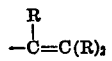

where R is hydrogen, halogen, or a monovalent aliphatic or aromatic radical.

The prepolymers of this invention may be made by end capping an aliphatic or aromatic perhalogenated polymer with an alicyclic endo compound. The prepolymer which may be produced by the chain stopping alicyclic endo end cap may be illustrated ideally as follows:

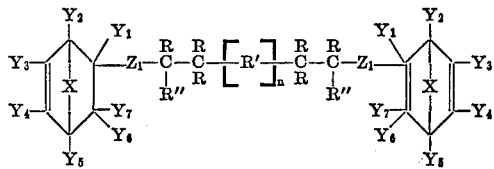

wherein $Y_1$–$Y_7$, X, Z, and R are defined previously. R' is an aliphatic or aromatic perhalogenated polymer and R'' is a free radical initiator moiety. The subscript n denotes an integer of sufficient size to yield a prepolymer having a molecular weight of up to about 20,000.

Product properties of the cured polymer can be enhanced by the inclusion of olefinic crosslinking agents in amounts up to about 10% by weight of the resin at initiation of cure.

DISCLOSURE OF THE INVENTION

High performance resins are made by curing prepolymers prepared by end capping an aliphatic or aromatic prehalogenated polymer with an alicyclic endo compound. The prepolymers are characterized in that they are shelf-stable solids which react through the alicyclic endo compound to form a polymer having good properties in the temperature range of 280° C.–370° C. One of the chief advantages of these resins, in addition to their excellent physical chemical, and thermal properties, is the ease with which articles may be fabricated from them. Thus, rather than fabricating articles from a liquid resin, fabricators may form the solid prepolymers of this invention from the liquid starting materials and fabricate the articles from a dry or slightly tacky prepolymer. The savings in cleanup time and materials is substantial without sacrifice of product properties.

Alicyclic endo end cap compounds used in this invention are synthesized by reacting a cyclodiolefin having the formula:

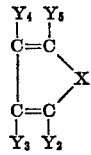

wherein $Y_2$–$Y_5$, inclusive, may be selected from any of hydrogen, halogen, nitro, aryl, alkyl having 1 to 6 carbon atoms, alkyl ether having 1 to 6 carbon atoms, alkaryl; and X may be selected from any of carbonyl, oxygen, sulfur, methylene, halogen substituted methylene, alkyl substituted methylene, and aryl substituted methylene, with an olefinic compound having the formula:

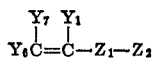

wherein $Y_6$, $Y_7$, and $Y_1$ are selected from the groups represented by $Y_2$–$Y_5$; $Z_1$ is an arylene or an alkylene or halogen substituted alkylene radical having 0 to 4 carbon atoms; and $Z_2$ may be seelcted from:

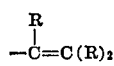

where R is hydrogen, halogen, or a monovalent aliphatic or aromatic radical. Ideally, the reaction may be represented as follows:

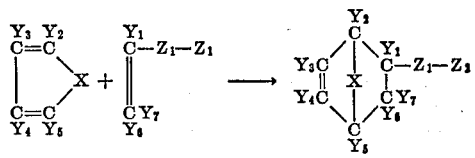

wherein $Y_1$–$Y_7$), X, $Z_1$ and $Z_2$ have been identified above.

The reaction is carried out in a liquid solvent, such as benzene, and temperatures of the reaction may range from room temperature to about 200° F.

The following table provides a list of a few of the representative cyclodiolefin compounds which are suitable for reaction to produce the alicyclic endo end cap compound.

TABLE I furane
cyclopentadieneone
3,4-diphenylthiophene
cyclopentadiene
methylcyclopentadiene
1,1,2,3,4,5-hexachlorocyclopentadiene
1,1,2,3,4,5-hexafluorocyclopentadiene The following table provides a list of a few of the representative olefinic compounds which are suitable for reaction to produce the alicyclic endo end cap compound.

TABLE II 1,3-butadiene
perchloro-1,3-butadiene
perfluoro-1,3-butadiene
perbromo-1,3-butadiene
1,4-pentadiene
perchloro-1,4-pentadiene
perfluoro-1,4-pentadiene
perbromo-1,4-pentadiene
1,5-hexadiene
perchloro-1,5-hexadiene
perfluoro-1,5-hexadiene
perbromo-1,5-hexadiene Prepolymers according to this invention are produced by including an alicyclic endo end capping compound into the polymerization reaction of a perhalogenated compound so that the polymerization reaction is stopped by the end cap. Thus, for example, in the case of the polymerization of tetrafluoroethylene, the prepolymer which has been end capped with the alicyclic endo compound, the simplified reaction may be illustrated ideally as follows:

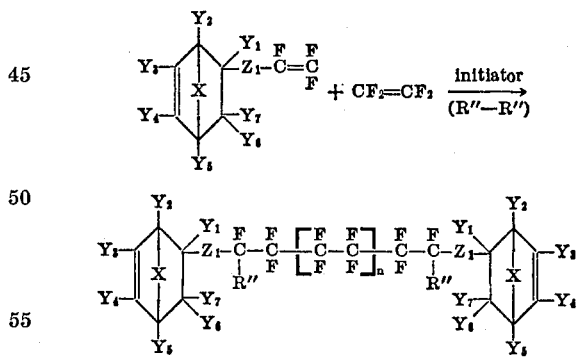

where $Y_1$–$Y_7$, X, Z have been previously defined. The subscript n is an integer of sufficient size as to yield a prepolymer having a molecular weight of up to about 20,000. R''—R'' denoted a free radical initiator, such as benzoyl peroxide or t-butyl peroxide, the moiety of which attached to the unsaturated substituent on the end cap. Details of the polytetrafluoroethylene polymerization reaction may be found throughout the literature and, specifically, in U.S. Pat. 2,230,654.

Similar prepolymers can be prepared by end capping polychlorotrifluoroethylene with the alicyclic endo compound. Details of the preparation of polychlorotrifluoroethylene may be found throughout the literature, and specifically in U.S. Pats. 2,579,437 and 2,600,804.

Although the prepolymers may be synthesized from any aliphatic or aromatic perhalogenated polymeric compound, for purposes of this invention, examples of several specific monomers are listed in the following table.

TABLE III tetrafluoroethylene
chlorotrifluoroethylene
trifluorostyrene
perfluoropropylene
tetrafluorobenzene Reaction of the prepolymer to form the polymeric product occurs through the alicyclic endo end capping compounds. While the exact mechanism of the polymeric reaction is not understood, it is postulated that a three-dimensional thermoset polymer is formed when the prepolymer is subjected to temperatures ranging from approximately 230° C. to 370° C. for up to 4 hours. Although it is not necessary for cure, it has been found that the application of pressure up to 700 atmospheres is beneficial in removing voids with the resultant improvements in product properties. The cure times, temperatures, and pressures are variables which depend on the composition, mass, and shape of the article being produced. For example, the cure for a large mass of neat resin may require a lower temperature applied for a longer period of time at a higher pressure in order to avoid cracking or checking, than a thin impregnated glass laminated article or a small article containing up to 80% by weight inert fillers, such as inorganic salts, metals, or other common filler materials.

In order to enhance product properties, crosslinking agents may be incorporated into the polymer chain. Solid or liquid organic compounds having olefinic unsaturation can be added to the initial starting materials, while gaseous organic olefins are introduced into the starting material by reaction under pressure up to about 3,000 p.s.i. Normally, an amount of crosslinking agent equivalent up to 10% by weight of resins at initiation of cure is used. Specific examples of a few of the gaseous olefinic compounds which are suitable crosslinking agents are ethylene, propylene, halogenated ethylene, halogenated propylene, and halogenated butadiene. Specific examples of liquid olefinic compounds which are suitable crosslinking agents are styrene, furane, crotonic acid, and acrylic acid and halogenated derivatives, phenyl substituted, or methyl substituted forms thereof. Specific examples of a few of the solid olefinic compounds which are suitable crosslinking agents for purposes of this invention are tetraphenylcyclopentadiene, maleic acid and derivatives, cinnamic acid, and stilbene. In addition to the gaseous, liquid, or solid crosslinking agents, crosslinking sites may be built into the polymer chain by the use of polymer reactants having diolefinic substitutes; for example, perhalobutadiene. Furthermore, it should be readily apparent to those skilled in the art that various combinations of the above crosslinking agents may be used.

The following examples are illustrative of the procedure used to practice this invention.

EXAMPLE I

Preparation of 2,5-endodifluoromethylene-1-trifluoro-vinyl-perfluoroheptene

Approximately 17 grams of perfluorocyclopentadiene and 16 grams of perfluorobutadiene are mixed in a sealed vessel containing 100 ml. of benzene. The temperature is gradually raised to 100° C. and the vessel is held at this temperature for eight hours. The flask is cooled and the 2,5-endodifluoromethylene-1-trifluorovinylperfluoroheptene is distilled out of the vessel at 50–60° C.

EXAMPLE II

Preparation of perfluorinated polymer

Approximately 33 grams 2,5-endodifluoromethylene-1-trifluorovinylperfluoroheptene is placed in 100 ml. of water and rapidly stirred in an autoclave. Approximately 0.5 g. of ammonium persulfate and 102 g. of tetrafluoroethylene are introduced at 25° C. and the mixture is stirred for 4 hours at this temperature. The autoclave is then cooled at 0° C. and a solid product is isolated. The prepolymer is then heated in an oven at 300° C. for eight hours to form a thermoset, solid powder is formed.

We claim:
1. A method of making a prepolymer comprising polymerizing
   (A) perhalogenated ethylenically unsaturated hydrocarbons, and
   (B) an end cap compound comprising a substituted alicyclic endo compound having the formula:

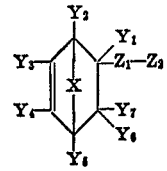

to give a prepolymer having a molecular weight ranging up to about 20,000, wherein $Y_1$–$Y_7$, inclusive, is selected from the group consisting of hydrogen, halogen, nitro, aryl, alkyl having 1 to 6 carbon atoms, alkyl ether having 1 to 6 carbon atoms, and alkaryl; X is selected from the group consisting of carbonyl, sulfur, methylene, halogen substituted methylene, alkyl substituted methylene, and aryl substituted methylene; $Z_1$ is selected from the group consisting of arylene and alkylene or halogen substituted alkylene radical having 0 to 4 carbon atoms; and $Z_2$ is selected from the group consisting of

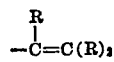

where R may be hydrogen, halogen, a monovalent aliphatic radical, or monovalent aromatic radical in the presence of a free radical peroxide catalyst.

2. A method of making a thermosetting prepolymer according to claim 1 wherein the perhalogenated compound is tetrafluoroethylene.

3. A method of making a thermosetting prepolymer according to claim 1 wherein the perhalogenated compound is chlorotrifluoroethylene.

4. A thermosetting prepolymer having the formula:

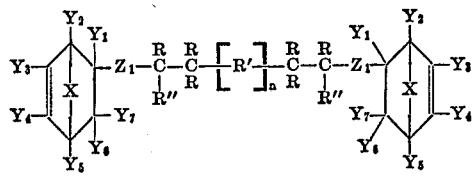

wherein R is selected from the group consisting of hydrogen, halogen, monovalent aliphatic radical, and monovalent aromatic radical; R' is a perhalogenated ethylenically unsaturated hydrocarbon polymer; R" is an initiator moiety; $Y_1$–$Y_7$, inclusive, is selected from the group consisting of hydrogen, halogen, nitro, aryl, alkyl having 1 to 6 carbon atoms, alkyl ether having 1 to 6 carbon atoms, and alkaryl; X is selected from the group consisting of carbonyl, sulfur, methylene, halogen substituted methylene, alkyl substituted methylene, and aryl substituted methylene; $Z_1$ is selected from the group consisting of arylene and alkylene or halogen substituted alkylene radical having 0 to 4 carbon atoms; and $n$ is an integer of sufficient size to render said prepolymer of a molecular weight of up to 20,000.

5. A thermosetting prepolymer according to claim 4 wherein the perhalogenated compound is tetrafluoroethylene.

6. A thermosetting prepolymer according to claim 4 wherein the perhalogenated compound is chlorotrifluoroethylene.

7. A thermoset polymer produced by curing the prepolymer of claim 4.

8. A thermoset polymer produced by curing the prepolymer of claim 5.

9. A thermoset polymer produced by curing the prepolymer of claim 6.

10. A method of making a prepolymer according to claim 1 wherein an olefinic crosslinking agent selected from the group consisting of ethylene, propylene, styrene, furane, crotonic acid, tetraphenylcyclopentadiene, maleic acid, cinnamic acid, stilbene, and acrylic acid is reacted.

References Cited
UNITED STATES PATENTS

| | | | |
|---|---|---|---|
| 3,330,815 | 7/1967 | McKeon et al. | 260—93.1 |
| 3,336,275 | 8/1967 | Michelotti | 260—93.1 |
| 2,799,668 | 7/1957 | Anderson et al. | 260—93.1 |
| 3,183,220 | 5/1965 | Dekking | 260—93.1 |

HARRY WONG, JR., Primary Examiner

U.S. Cl. X.R.

260—41 R, 41 B, 78.5 R, 79.7, 80.72, 80.77, 80.78, 80.8, 87.5 A, 87.5 B